United States Patent
Yi et al.

(10) Patent No.: US 9,229,246 B2
(45) Date of Patent: Jan. 5, 2016

(54) ATTACHABLE/DETACHABLE COVERING LENS

(71) Applicants: Jung Soo Yi, San Diego, CA (US);
Young Hee Yi, Bethesda, MD (US);
Jung Ho Yi, San Diego, CA (US)

(72) Inventors: Jung Soo Yi, San Diego, CA (US);
Young Hee Yi, Bethesda, MD (US);
Jung Ho Yi, San Diego, CA (US)

( * ) Notice: Subject to any disclaimer, the term of this patent is extended or adjusted under 35 U.S.C. 154(b) by 135 days.

(21) Appl. No.: 14/194,732

(22) Filed: Mar. 2, 2014

(65) Prior Publication Data

US 2014/0176898 A1     Jun. 26, 2014

Related U.S. Application Data

(63) Continuation of application No. 13/013,813, filed on Jan. 26, 2011, now Pat. No. 8,702,230.

(60) Provisional application No. 61/299,008, filed on Jan. 28, 2010.

(51) Int. Cl.
| | |
|---|---|
| G02C 7/16 | (2006.01) |
| G02C 7/08 | (2006.01) |
| G02C 9/04 | (2006.01) |
| G02B 27/22 | (2006.01) |
| G02C 7/10 | (2006.01) |
| G02B 27/26 | (2006.01) |

(52) U.S. Cl.
CPC ............ *G02C 7/088* (2013.01); *G02B 27/2228* (2013.01); *G02C 7/08* (2013.01); *G02C 7/086* (2013.01); *G02C 7/10* (2013.01); *G02C 9/04* (2013.01); *G02B 27/26* (2013.01)

(58) Field of Classification Search
CPC ........ G02C 2202/16; G02C 11/02; G02C 7/12
USPC ..................... 351/45, 46, 47, 57, 41
See application file for complete search history.

(56) References Cited

U.S. PATENT DOCUMENTS

| | | | |
|---|---|---|---|
| 2,511,329 A | 1/1950 | Craig | |
| 3,628,854 A | 12/1971 | Jampolsky | |
| 4,508,526 A | 4/1985 | Dutcher | |
| 5,617,153 A * | 4/1997 | Allen | G02C 7/10 351/44 |
| 5,764,333 A | 6/1998 | Somsel | |
| 6,003,990 A * | 12/1999 | Einhorn | G02C 7/086 351/45 |
| 6,113,233 A | 9/2000 | Miller | |
| 6,988,799 B2 | 1/2006 | Heisman | |
| 7,036,929 B1 | 5/2006 | Harvey | |
| 7,524,053 B2 | 4/2009 | Lipton | |

* cited by examiner

Primary Examiner — Hung Dang
(74) Attorney, Agent, or Firm — Ameh IP; Elahe S. Toosi; Lowell Campbell

(57) ABSTRACT

An attachable/detachable covering lens for covering eyeglass lenses is disclosed. A transparent optical material is suitably shaped to cover at least a portion of an eyeglass lens. The transparent optical material is coupled to the eyeglass lens by adhering means. The adhering means may comprise a viscosity of the transparent optical material. Embodiments of the disclosure provide mechanisms to easily provide attachable/detachable temporary lenses such as a sun-shield, temporary eyesight correction to the prescription lenses for applications such as reading, watching TV, or 3-D movie viewing. Embodiments of the disclosure also provide mechanisms for providing an easily attachable/detachable temporary prescription lens over special purpose glasses.

20 Claims, 9 Drawing Sheets

ATTACHABLE/DETACHABLE COVERING LENS

CROSS REFERENCE TO RELATED APPLICATIONS

This application claims priority to U.S. Non-Provisional patent application Ser. No. 13/013,813 entitled "ATTACHABLE/DETACHABLE CONTACT LENS" and filed on 26 Jan. 2011, now U.S. Pat. No. 8,702,230 which claims priority to U.S. Provisional Patent Application Ser. No. 61/299,008 entitled "ATTACHABLE/DETACHABLE CONTACT LENS FOR COVERING PRESCRIPTION LENSES" and filed on 28 Jan. 2010, the content of which are incorporated by reference herein in their entirety as part of the specification of this application.

FIELD

Embodiments of the present disclosure relate generally to eyeglasses, and more particularly relate to lenses for covering other lenses such as sunglasses, 3-D movie glasses, prescription glasses, and reading glasses.

BACKGROUND

Approximately 30% or more of the world's population wears prescription eyeglasses to correct their eyesight. Prescription eyeglasses with corrective lenses can be used to correct refractive errors in human eyes by modifying an effective focal length of an eye lens. Corrective lenses can be effective for alleviating effects of conditions such as near-sightedness (myopia), far-sightedness (hyperopia), astigmatism, presbyopia, and the like. Presbyopia is a common condition in older persons that can be caused by an eye's crystalline lens losing elasticity. Loss of elasticity due to presbyopia can progressively reduce an ability of the eye's crystalline lens to focus on objects close to the eye.

An individual who wears prescription lenses may have to rely on solutions such as prescription sunglasses, clip-on sunglasses over the prescription glasses, and wraparound sun shields attached to the prescription glasses to protect his/her eyes from harmful ultraviolet rays. Carrying both normal prescription eyeglasses and prescription sunglasses can be inconvenient and expensive. Also, using clip-on sunglasses or a wraparound sun shield may look unnatural or unfashionable and may be inconvenient.

SUMMARY

There are many occasions when an individual who wears prescription glasses forgets to bring his or her reading glasses for a long flight or other trip. However, the individual may still want to work or watch TV (e.g., mounted on a back of a seat in front of a passenger), or the individual may require sunglasses for a long drive. Moreover, it may be inconvenient to wear 3-dimensional (3-D) glasses over the prescription glasses while viewing a 3-D TV program or a 3-D movie.

Embodiments of the disclosure provide mechanisms to provide an easily attachable/detachable temporary sunshield, temporary eyesight correction to prescription lenses for reading, watching TV, or 3-D movie viewing without awkwardly overlaying the 3-D glasses over the prescription glasses. Embodiments of the disclosure also provide mechanisms for providing an easily attachable/detachable temporary prescription lens over special purpose glasses, such as but without limitation, 3-D movie glasses, sunglasses, sunshield, other prescription lenses, eyesight correction lenses, and the like.

An embodiment comprises an attachable/detachable lens for covering an eyeglass lens. The attachable/detachable lens comprises a transparent optical material suitably shaped to cover at least a portion of an eyeglass lens. The attachable/detachable lens further comprises adhesion means for coupling the transparent optical material to the eyeglass lens.

Another embodiment comprises a lens assembly. The lens assembly comprises a frame comprising eyeglass lenses coupled to one another by means of a bridge piece. The lens assembly further comprises covering lens means detachably coupled to each of the eyeglass lenses and comprising a transparent optical material suitably shaped to cover at least a portion of each of the eyeglass lenses.

Yet another embodiment comprises a method for covering eyeglass lenses. The method provides an eyeglass lens, and an attachable/detachable covering lens comprising a transparent optical material suitably shaped to cover at least a portion of the eyeglass lens. Further, the method adheres the attachable/detachable covering lens to the eyeglass lens.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure. The drawings are not necessarily made to scale.

DETAILED DESCRIPTION

Figure 1:
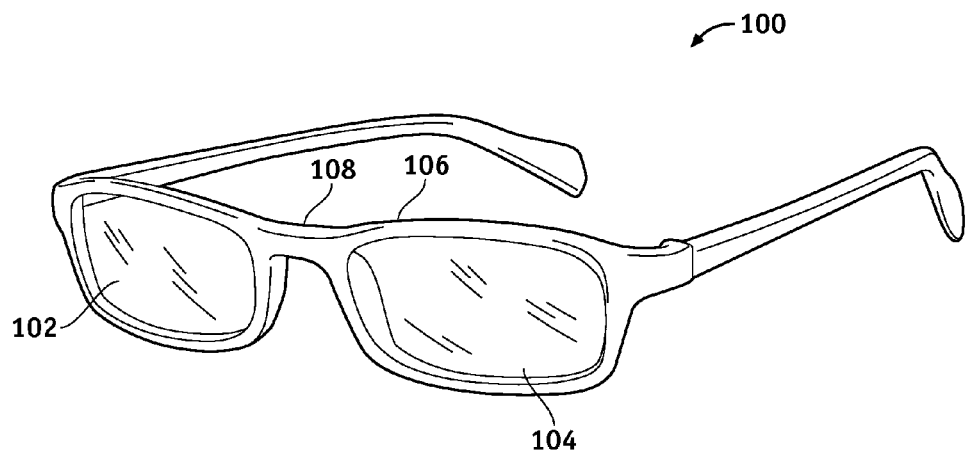
FIG. 1 is an illustration of prescription glasses.

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to manufacturing of covering lenses, materials and other functional aspects of a lens assembly (and the individual operating components of the lens assembly) may not be described in detail herein. In addition, those skilled in the art will appreciate that embodiments of the present disclosure may be practiced in conjunction with a variety of different lenses and eyeglasses, and that the attachable/detachable covering lens described herein is merely one example embodiment of the disclosure.

Embodiments of the disclosure are described herein in the context of one practical non-limiting application, namely, an easily attachable/detachable temporary covering lens for modifying optical properties of an eyeglass lens. Embodiments of the disclosure, however, are not limited to these applications, and the techniques described herein may also be utilized in other applications. For example, embodiments may be applicable to, for example but without limitation, industrial viewing applications, military viewing applications, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Embodiments of the disclosure described herein provide an easily attachable/detachable covering lens for covering eyeglass lenses. In one embodiment, the attachable/detachable covering lens comprises a non-prescription covering lens coupled to prescription lenses for applications, such as but without limitation, reading, watching TV, 3-D movie viewing without overlaying a potentially awkward and unfit 3-D glasses over the prescription glasses, and the like.

In another embodiment, the attachable/detachable covering lens comprises an easily attachable/detachable prescription covering lens coupled to special purpose lenses. In this manner, the attachable/detachable prescription covering lens may be applied over the special purpose lenses. The special purpose lenses may comprise, for example but without limitation, a sun-shield protection, sun-glasses, 3-D viewing glasses/lenses for temporary lens correction for viewing 3-D images (e.g., 3-D movies and industrial viewing applications), an eyesight power correction, an LCD shutter, two oppositely polarized filters, two oppositely colored filters, polarized 3-D movie viewing glasses, LCD-Shutter glasses, reading glasses, and the like.

FIG. 1 is an illustration of prescription glasses 100. The prescription glasses 100 comprise a frame 106 comprising two eyeglass lenses; a right lens 102 and a left lens 104 coupled to one another by means of a bridge piece 108. An individual who wears a prescription lens for correction of near-sightedness may need to carry another set of eyeglasses for reading, watching a small TV screen mounted close to his/her eyes, looking at a computer screen, and the like. However, near-sightedness is often accompanied with an astigmatism which requires a prescription from an ophthalmologist or an optometrist. Therefore, there is a need for a convenient and easily used mechanism to provide sun-shield, and temporary eyesight correction to prescription lenses for reading or watching TV, or 3-D movie viewing experience.

Figure 2:
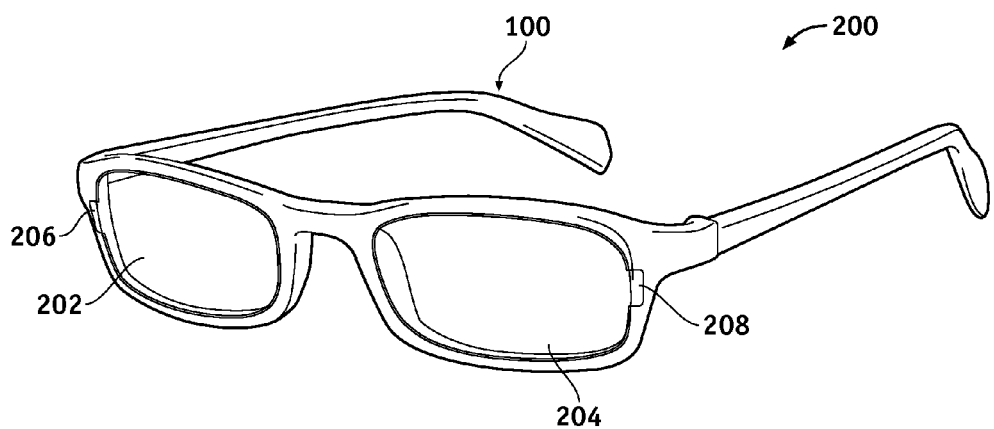
FIG. 2 is an illustration of exemplary attachable/detachable covering lenses coupled to the prescription glasses of FIG. 1 according to an embodiment of the disclosure.

FIG. 2 is an illustration of exemplary attachable/detachable covering lenses 202/204 coupled to the prescription glasses 100 of FIG. 1 according to an embodiment of the disclosure. A first attachable/detachable covering lens 202 is coupled to the right lens 102, and a second attachable/detachable covering lens 204 is coupled to the left lens 104.

The attachable/detachable covering lenses 202/204 may comprise lenses for a variety of purposes, for example but without limitation, a sun-shield, eyesight power correction, reading lenses, temporary 3-D polarized filters for viewing 3-D movies, temporary color filters for viewing 3-D movies, LCD-shutters for viewing 3-D movies, and the like.

The attachable/detachable covering lenses 202/204 may comprise a variety of optical materials such as transparent optical material suitably shaped to cover at least a portion of an eyeglass lens such as the right lens 102 and the left lens 104. The optical materials may comprise, for example but without limitation, soft cellophane-like, rigid formed flexible plastic, polymacon, silicon hydrogel, a pre-cut plastic, a stamp plastic, molded plastic, and the like.

The attachable/detachable covering lenses 202/204 may be coupled to the prescription glasses 100 by a variety of adhesion means, for example but without limitation, inherent viscosity of the optical materials without adhesives such as glue, electrostatic adhesion, a "low-tack," re-adherable pressure sensitive adhesive (e.g., as in sticky Post-it™ notes), and the like.

The attachable/detachable covering lenses 202 and 204 may each comprise tabs 206 and 208 respectively to assist in removal of the attachable/detachable covering lenses 202 and 204 respectively. The first attachable/detachable covering lens 202 may comprise the tab 206 for attaching and/or detaching the first attachable/detachable covering lens 202 to/from the right lens 102. Furthermore, the second attachable/detachable covering lens 204 may comprise the tab 208 for attaching and/or detaching the second attachable/detachable covering lens 204 to/from the left lens 104.

Figure 3:
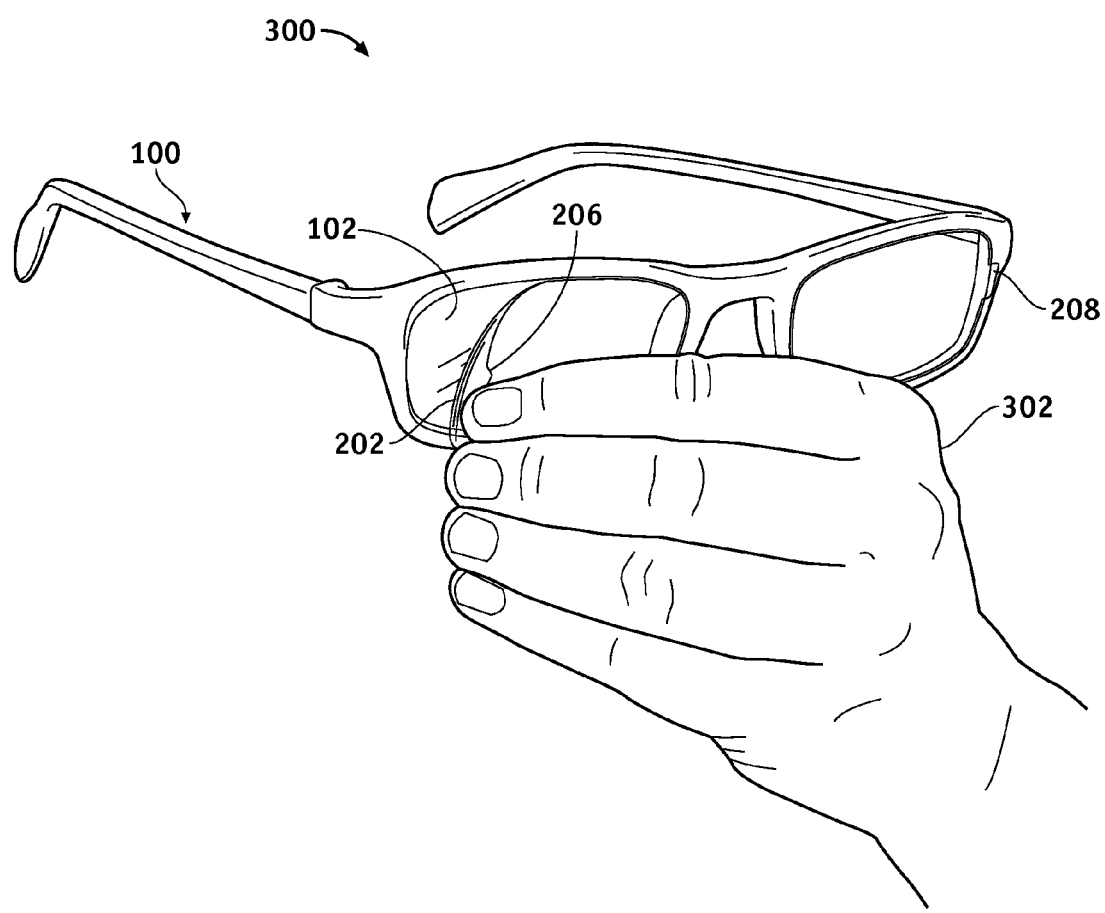
FIG. 3 is an illustration of an exemplary mechanism for detaching the exemplary attachable/detachable covering lens coupled to the prescription glasses of FIG. 2, according to an embodiment of the disclosure.

FIG. 3 is an illustration of an exemplary mechanism for detaching the exemplary attachable/detachable covering lenses 202/204 coupled/adhered to the prescription glasses of FIG. 2 according to an embodiment of the disclosure. The tabs 206/208 may be manually applied or removed by a hand 302. For example, the hand 302 may hold the first attachable/detachable covering lens 202 by the tab 206, and apply the first attachable/detachable covering lens 202 to the right lens 102. Conversely, the hand 302 may hold the first attachable/ detachable covering lens 202 by the tab 206, and detach the first attachable/detachable covering lens 202 from the right lens 102.

Figure 4:
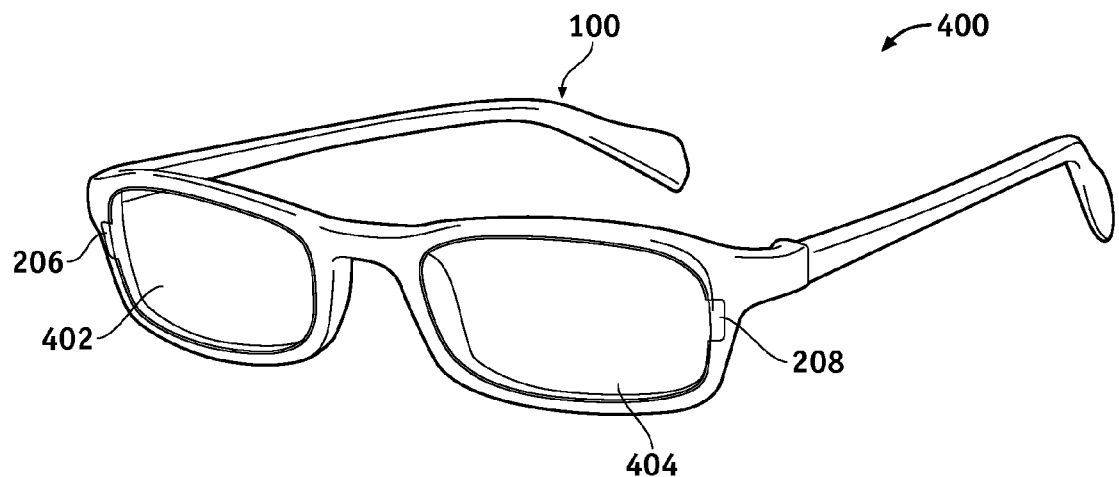
FIG. 4 is an illustration of prescription glasses with an exemplary attachable/detachable covering lens comprising a temporary sun-shield attached thereto, according to an embodiment of the disclosure.

FIG. 4 is an illustration of prescription glasses 400 comprising an exemplary attachable/detachable covering lens comprising a temporary sun-shield 402/404 attached thereto, according to an embodiment of the disclosure. The temporary sun-shield 402/404 may comprise, for example but without limitation, a sun-shield protection, photochromic lens type material, photo-grey material, transitions lens type material, a variable sun shield, polarized sun-shield, and the like.

Figure 5:
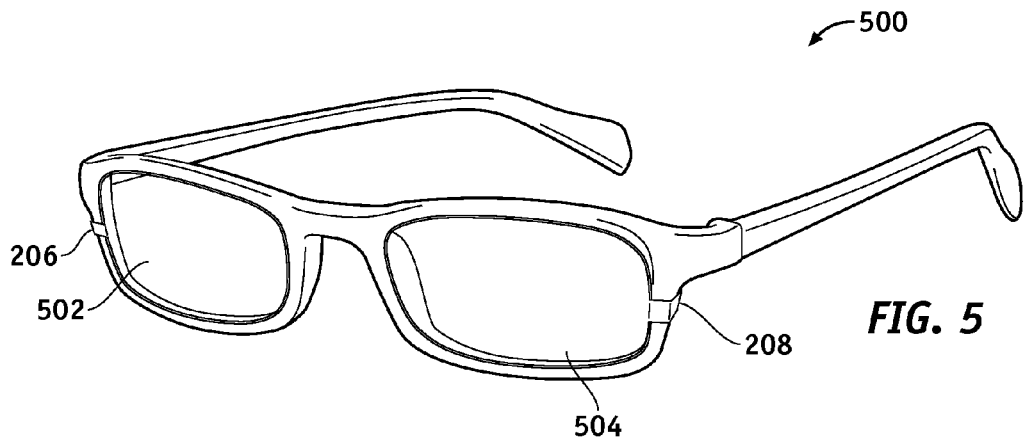
FIG. 5 is an illustration of prescription glasses with an exemplary attachable/detachable covering lens comprising a temporary eyesight power corrected cover for reading and viewing TV, according to an embodiment of the disclosure.

FIG. 5 is an illustration of prescription glasses 500 (100 in FIG. 1) comprising an exemplary attachable/detachable covering lens comprising a temporary eyesight power corrected cover according to an embodiment of the disclosure. The temporary eyesight power corrected cover may comprise a first temporary eyesight power corrective lens 502 for reading and/or viewing TV attached to the right lens 101 (FIG. 1) and a second temporary eyesight power correction cover 504 for reading and/or viewing TV attached to the left lens 102 (FIG. 1). The first temporary eyesight power correction cover 502 may comprise the tab 206 for attaching and/or detaching the first temporary eyesight power correction cover 502 to/from the right lens 101. Furthermore, the second temporary eyesight power correction cover 504 may comprise the tab 208 for attaching and/or detaching the second temporary eyesight power correction cover 504 to/from the left lens 102.

A corrective ability or optical power of a lens is generally measured in terms of diopter. A diopter is a unit of measurement of an optical power of a lens. The diopter is equal to a reciprocal of a focal length of a lens (e.g., a diopter of X has a focal length of 1/X meters). Diopter is generally measured in meters. Optical power is a degree to which a lens or optical system converges or diverges light measured in diopters.

For example, an individual who does not have astigmatism can purchase over-the-counter reading glasses typically rated at about +1.00 to about +3.23 diopters. Glasses correcting for the near-sighted (myopia) will generally have negative diopter strength prescription lenses comprising correction for the astigmatism if needed. An individual who wears negative diopter eyeglasses generally needs to compensate for positive diopter for reading. For example, an about −6.5 diopter lens could be corrected to about −4.5 diopter for reading by adding an about +2.0 diopter lens. For an individual who is near-sighted with astigmatism, he or she may not have much choice but carrying two sets of eyeglasses.

Myopia ("nearsightedness") is a refractive imperfection of an eye in which collimated light produces an image focus in front of a retina when accommodation is relaxed. Those with myopia may see near objects clearly but far away objects may appear blurred. With myopia, an eyeball is too long relative to a focal length of a cornea or a surface of the cornea has too steep a curvature reducing the focal length, so images are focused in the vitreous inside the eyeball rather than on the retina at the back of the eyeball. Myopia is generally corrected through the use of corrective lenses, such as glasses or contact lenses.

An imperfection opposite of myopia is hyperopia ("far-sightedness") where the eyeball is too small relative to a focal length of the cornea or the cornea has too flat a curvature reducing the focal length, so images are focused beyond the retina at the back of the eyeball. Hyperopia may also be referred to as "long-sightedness" or "hypermetropia". Hyperopia may cause difficulty focusing on near objects, and in extreme cases may cause a sufferer to be unable to focus on objects at any distance. As an object moves toward the eye, the eye must increase its power to keep the image in focus on the retina. If a power of the cornea and the lens is insufficient, as in hyperopia, the image will appear blurred. People with hyperopia can experience blurred vision, asthenopia, accommodative dysfunction, binocular dysfunction, amblyopia, and strabismus. Hyperopia is generally corrected through the use of corrective lenses, such as glasses or contact lenses.

Hyperopia is often confused with presbyopia, which is another condition that may cause blurry near-field vision. Presbyopes who report good far vision typically experience blurry near-field vision because of a reduced accommodative amplitude in a crystalline lens of the eyeball. The reduced accommodative amplitude may be caused by natural aging changes of the crystalline lens. Presbyopia is also sometimes referred to as farsightedness, since in otherwise normally-sighted persons presbyopia may make focus on near objects more difficult than on far objects.

Presbyopia is a health condition where the eye exhibits a progressively diminished ability to focus on near objects with age. Symptoms may generally be noticed between ages of 40-50 years. An ability to focus on near objects may decline throughout a human life, from an accommodation of about 20 dioptres (ability to focus at 50 mm away) in a child, to about 10 dioptres (100 mm) at age 25, and levels off at about 0.5 to about 1 dioptre (ability to focus down to 1-2 meters) at age 60 years.

Astigmatism is an optical imperfection, where vision is blurred due to an inability of optics of an eye to focus a point object into a sharp focused image on the retina. Astigmatism may be caused by an irregular or toric curvature of the cornea or the lens. Two types of astigmatism comprise regular astigmatism and irregular astigmatism. Regular astigmatism may arises from curvature of the cornea or the crystalline lens, and may be corrected by a toric lens. Irregular astigmatism may be caused by a corneal scar or scattering in the crystalline lens, and may not generally be corrected by standard spectacle lenses, but may be corrected by contact lenses.

The toric curvature (toric surface) may resemble a section of a surface of an American football or a doughnut where there are two regular radii, one smaller than another. An optical shape of the toric curvature may gives rise to regular astigmatism in the eye. A refractive error of an astigmatic eye may result from a difference in degree of curvature refraction of the two different meridians (i.e., the eye has different focal points in different planes). For example, the image may be clearly focused on the retina in the horizontal (sagittal) plane, but not in the vertical (tangential) plane. Astigmatism may cause difficulties in seeing fine detail, and in some cases vertical lines (e.g., walls) may appear to be tilted.

The astigmatic optics of the eye may be corrected by spectacles, hard contact lenses or contact lenses that have a compensating lens (i.e., a lens that has different radii of curvature in different planes). Although mild astigmatism may be asymptomatic, higher amounts of astigmatism may cause symptoms such as blurry vision, squinting, asthenopia, fatigue, or headaches. Nearly 3 in 10 children between the ages of 5 and 17 may have astigmatism. A prevalence of astigmatism in adults may reach nearly 1 in 3 (32.4%) of those over the age of 30. The prevalence of astigmatism may increase with age. A lens that provides astigmatism correction may comprise an asymmetry (i.e., a different radii of curvature in different planes) indicated by a direction (astigmatism correction angle) such as a long axis of the asymmetry.

Figure 6:
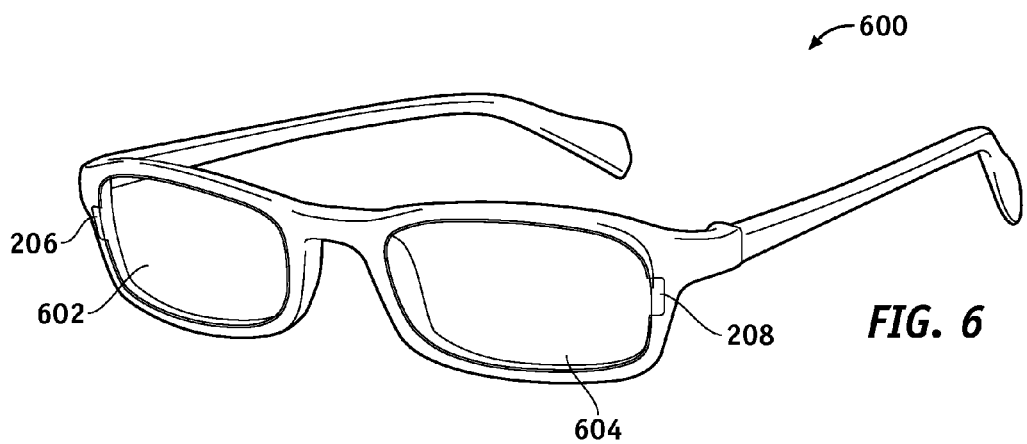
FIG. 6 is an illustration of prescription glasses with an exemplary attachable/detachable covering lens comprising a temporary 3-D polarized filter for viewing a 3-D movie, according to an embodiment of the disclosure.

FIG. 6 is an illustration of prescription glasses 600 (100 in FIG. 1) with an exemplary attachable/detachable covering lens comprising temporary 3-D polarized filters 602/604 (3-D viewer) for viewing 3-D movie according to an embodiment of the disclosure. The first temporary 3-D polarized filter 602 for viewing a 3-D movie is attached to the right lens 102 and a second temporary 3-D polarized filter 604 for viewing a 3-D movie is attached to the left lens 104. The first temporary 3-D polarized filter 602 may comprise the tab 206 for attaching and/or detaching the first temporary 3-D polarized filter 602 to/from the right lens 101. Furthermore, the second temporary 3-D polarized filter 604 may comprise the tab 208 for attaching and/or detaching the second temporary 3-D polarized filter 604 to/from the left lens 102.

In order to view 3-D movies and television, stereoscopic glasses are generally used to provide a 3-D effect. In a 3-D movie system, each of a viewer's eyes is provided with a different perspective. Objects on the screen are presented in two views, one view for the left eye and one view for the right eye.

When making a 3-D movie, different parts of scenes of the movie have different perceived depths, furthermore, parts of scenes may be given different focuses. Also, each person's eyes and brains process an image in a way that is customized to the individual and may not work in concert with the 3-D glasses. As a result, some 3-D movie viewers have experienced fatigue and headaches from viewing 3-D movies. The embodiment shown in FIG. 6 allows 3-D viewing lenses to be customized or custom chosen by the user to fit his/her eyes and viewing needs.

Many systems for viewing 3-D movies in a theater or home TV use a system for providing different images to the left and right eye to create 3-dimensional depth. A 3-D movie system generally uses different filters for each eye such as different (oppositely) colored lenses, polarized lenses, LCD shutters in lenses, and the like. For example, many older films use a green filtered lens for one eye and a red filtered lens for the other eye.

For another example, many films use one direction (polarization angle) of polarization for one eye lens and an opposite (orthogonal) polarization for the other eye lens. Types of polarization may comprise, for example but without limitation, linear (e.g., vertical and horizontal), circular (e.g., right and left circular), elliptical and the like. Using polarized eyeglasses, the left side polarized lens filters only left eye images and the right side polarized lens filters only the right eye side images.

Figure 7:
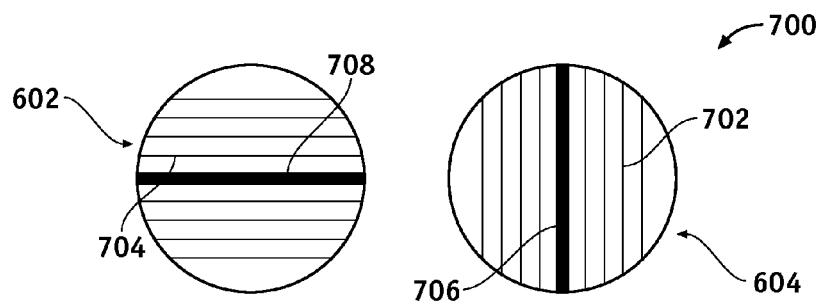
FIG. 7 is an illustration of an exemplary vertical and horizontal temporary 3-D polarized attachable/detachable covering lens with an orientation tab according to an embodiment of the disclosure.

FIG. 7 is an illustration of an exemplary vertical 702 and horizontal 704 temporary 3-D polarized attachable/detachable covering lens comprising an orientation tab such as removable orientation marker 706/708 according to an embodiment of the disclosure. The removable orientation marker 706/708 can be used for orienting the transparent optical material to provide an optical effect orientation. The optical effect orientation may comprise, for example but without limitation, polarization orientation, astigmatism orientation, and the like. Alternatively, at least one of the tabs 206/208 (FIG. 6) is suitably shaped to be used for orienting the transparent optical material to provide the optical effect orientation.

Theaters generally distribute plastic glasses for use during a film, and home users also generally require such glasses. The currently used 3-D glasses for viewing of 3-D movies in a theater and on a home TV are convenient for the viewers who do not need to wear prescription eyeglasses. However, someone who needs corrected eyeglasses may have to wear the 3-D glasses over original corrected eyeglasses to view the 3-D movies or 3-D TV programs. Wearing the 3-D glasses over the original corrected eyeglasses may look awkward, may be inconvenient, uncomfortable for the wearer's ears, and may cause nausea and dizziness as well.

Figure 8:
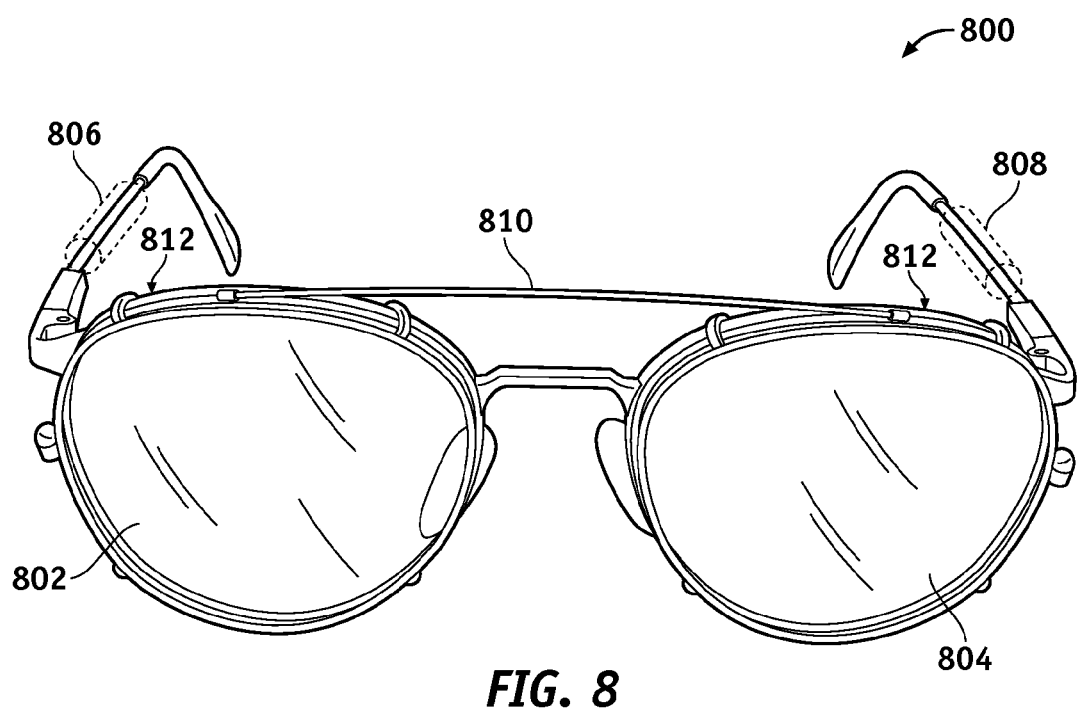
FIG. 8 is an illustration of an exemplary clip-on active shutter type 3-D movie viewing glasses covering prescription glasses/lenses according to an embodiment of the disclosure.

FIG. 8 is an illustration of an exemplary clip-on active shutter type 3-D movie viewing glasses assembly 800 showing an active shutter type 3-D movie viewing glasses clip-on device 810 (clip-on device 810) comprising lenses 802/804 clipped on a prescription glasses/lenses 812 according to an embodiment of the disclosure. Many films use active eyeglasses with an LCD shutter, where the left and right eye lenses alternately block and transmit light. Left and right images can be alternately shown on a screen and a left eye LCD shutter and a right eye LCD shutter is synchronized to its respective left eye side image or right eye side image via signals from a 3-D TV set.

The clip-on device 810 may be a single piece, or individual clip-on devices. For two individual clip-on devices for 3-D viewing that use LCD shutters, synchronization may be needed with a 3-D display using a synchronization system. Left eye lens shutters may be synchronized to an image shown on the 3-D display for the left eye, and right eye lens shutters may be synchronized to an image shown on the 3-D display for the right eye. The synchronization system, may comprise, for example but without limitation, a radio frequency (RF), Infrared, Bluetooth™, and the like, and may be used for synchronizing the individual lenses, and/or each or both lenses 802/804 with the movie.

For shutter 3-D systems, one eye is blocked while the other eye is not-blocked, and vice versa in alternate frames. For example, a 3-D TV may alternate 3-D frames (e.g., left for odd frames and right for even frames) at about 240 Hz, so 120 frames per second are shown to the left eye and 120 frames per second are shown to the right eye.

Since shutter lenses may be larger and heavier than a passive lens (FIG. 9), and may require an electronic control and driver system 806/808, a clip-on device such as the clip-on device 810 may be used.

Figure 9:
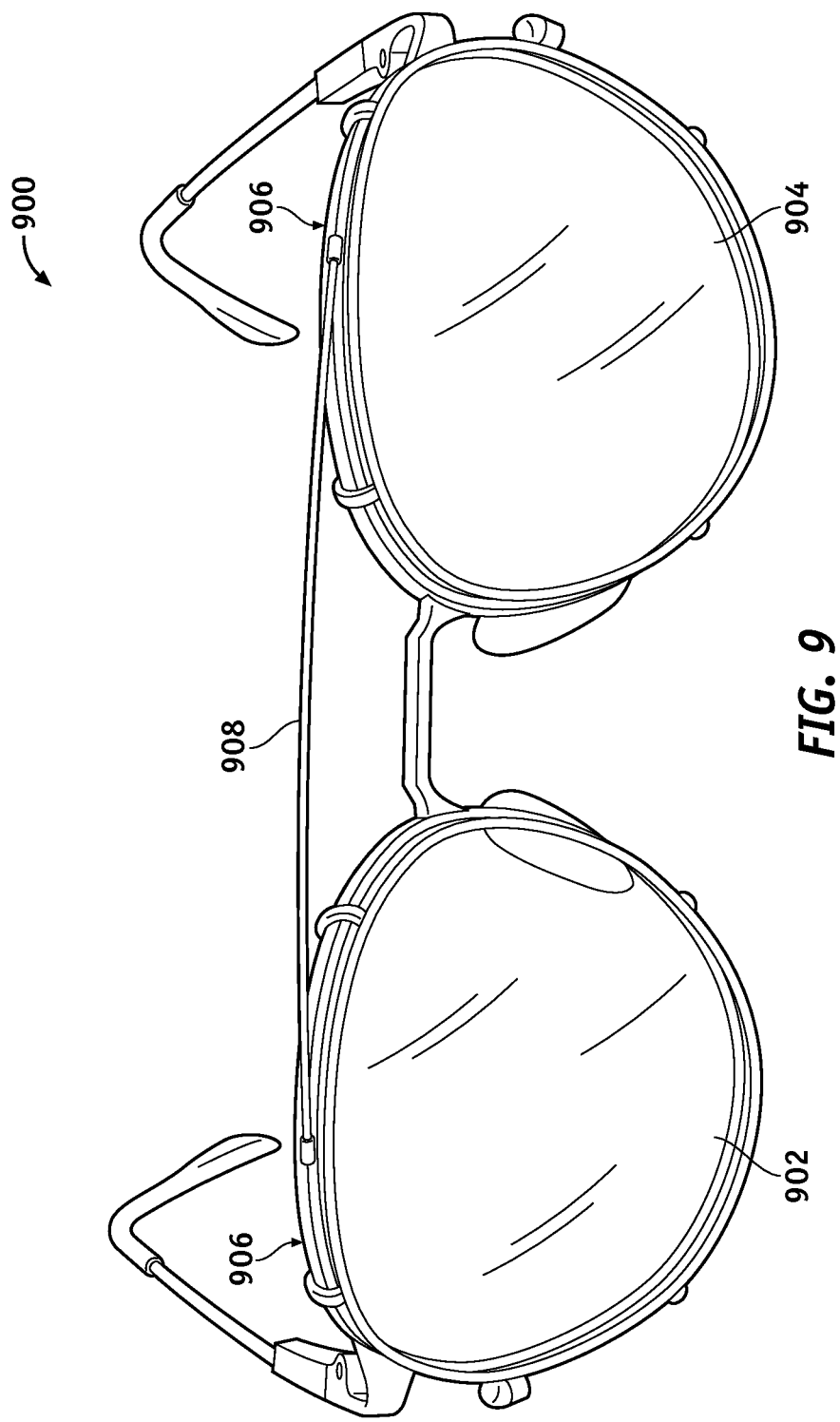
FIG. 9 is an illustration of an exemplary clip-on corrective reading glasses or polarized passive 3-D movie viewing glasses assembly according to an embodiment of the disclosure.

FIG. 9 is an illustration of an exemplary clip-on corrective reading glasses or polarized passive 3-D movie viewing glasses assembly 900 according to an embodiment of the disclosure. The assembly 900 shows the reading glasses or the polarized passive type 3-D movie viewing glasses as a clip-on device 908 comprising lenses 902/904 clipped on prescription glasses/lenses 906. The clip-on device 908 may also comprise, for example but without limitation, a sun-shield such as the sun-shield 402/404 (FIG. 4), corrective lenses such as the corrective lenses 502/504 (FIG. 5), the passive polarized lenses such as the temporary 3-D polarized filters 602/604 (FIG. 6), and the like.

Passive mechanisms can generally be sub-classified into two different ways to generate left and right images. One way is that left and right images are interleaved line by line with micro-polarized eye filters for each line. Another way is that the left and the right images display alternatively synchronized with polarizations. Generally, passive mechanisms can be used and/or distributed at a theater or at home.

As mentioned above, in an embodiment, the attachable/detachable covering lens comprises an easily attachable/detachable prescription covering lens coupled to special purpose lenses. In this manner, the attachable/detachable prescription covering lens may be applied over the special purpose lenses.

Figure 10:
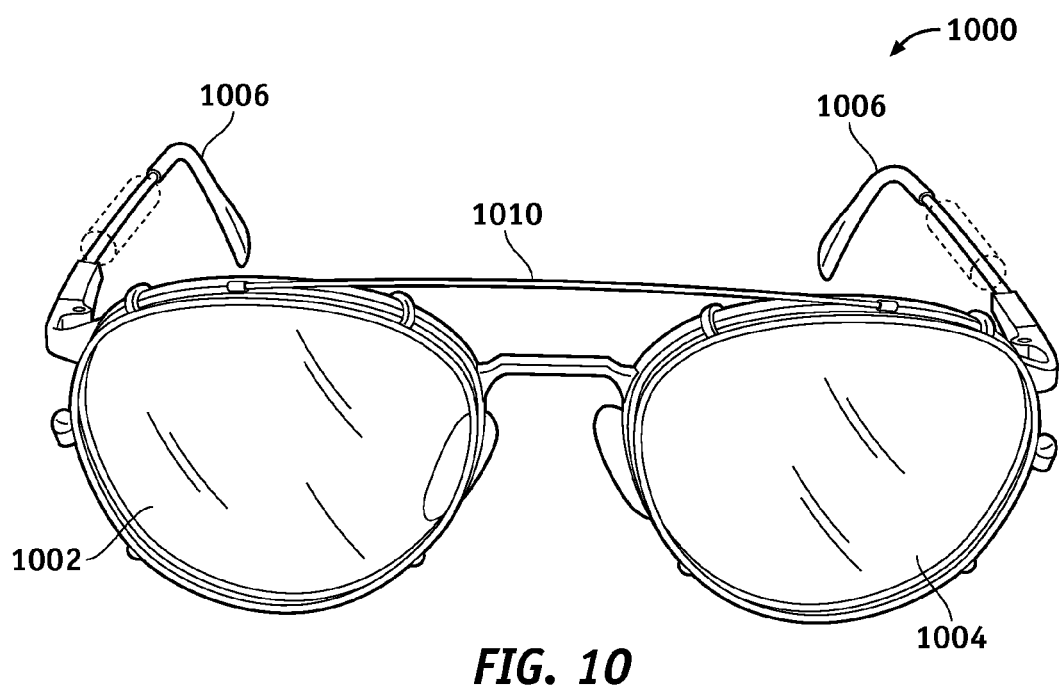
FIG. 10 is an illustration of exemplary clip-on prescription glasses/lenses covering special purpose glasses according to an embodiment of the disclosure.

FIG. 10 is an illustration of exemplary clip-on prescription lens assembly 1000 showing exemplary clip-on prescription lenses 1010 (clip-on device 1010) comprising a right lens 1002 and a left lens 1004 covering special purpose glasses 1006 according to an embodiment of the disclosure. The embodiment shown in FIG. 10 may have functions, material, and structures that are similar to the embodiments shown in FIG. 8. Therefore common features, functions, and elements may not be redundantly described here.

The clip-on device 1010 may be a single piece, or individual clip-on devices. The clip-on device 1010 may be used for eye-sight correction over the special purpose glasses 1006, such as but without limitation, sun-shield protection, sun-glasses, 3-D viewing glasses/lenses (polarized passive 3-D or polarized active 3-D), and the like.

The clip-on prescription lens assembly 1000 shows the clip-on device 1010 as an example of a coupling mechanism for coupling the attachable/detachable prescription covering lens to the special purpose glasses 1006 via clipping-on. However, the attachable/detachable prescription covering lens may also be coupled to the special purpose glasses 1006 by a variety of adhesion means, for example but without limitation, inherent viscosity of the optical materials without adhesives such as glue, electrostatic adhesion, a "low-tack" re-adherable pressure sensitive adhesive (e.g., as in sticky Post-it™ notes), and the like, as explained above in the context of discussion of FIG. 2.

Figure 11:
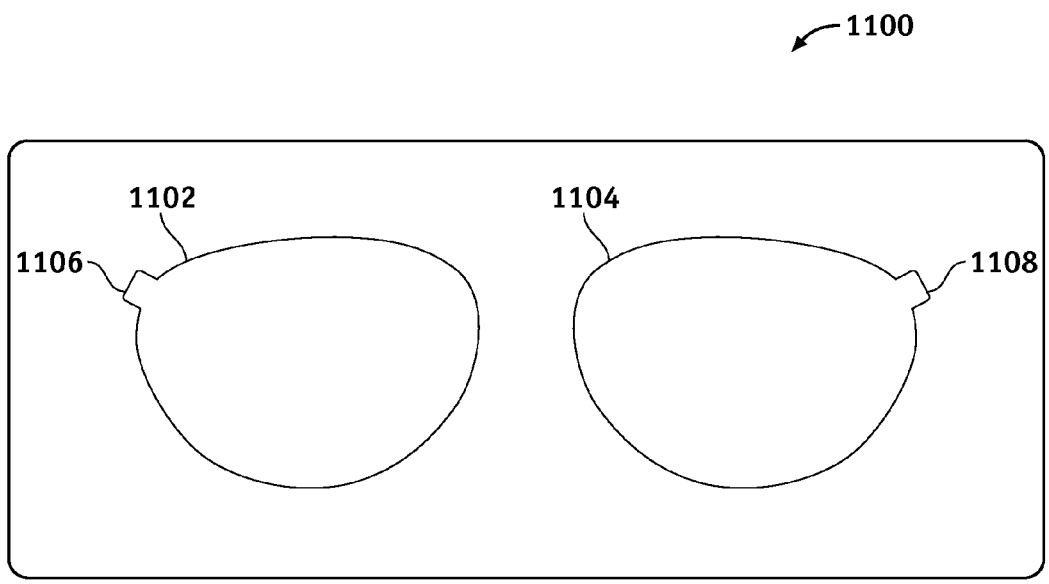
FIG. 11 is an illustration of an exemplary carrying case for an attachable/detachable covering lens according to an embodiment of the disclosure.

FIG. 11 is an illustration of an exemplary carrying case 1100 for an attachable/detachable covering lens according to an embodiment of the disclosure. As explained above, the attachable/detachable covering lens may comprise, for example but without limitation, a sun-shield, prescription lenses, an eye-sight correction lens, 3-D viewing polarization filters, and the like. The carrying case 1100 comprises containers/pockets 1102/1104 that may contain a pre-cut attachable/detachable covering lens, such as but without limitation, a sun-shield such as the sun-shield 402/404, an eye-sight correction lens such as the eyesight power correction cover 502/504, prescription lenses, 3-D viewing polarization filters such as the temporary 3-D polarized filters 602/604, a combination thereof, and the like. The carrying case 1100 may comprise tab holders 1106/1108 suitably formed to allow fitting the tabs 206/208 (FIG. 2) therein respectively. The carrying case 1100 may comprise, for example but without limitation, a plastic perform, a glass container, and the like. The carrying case 1100 may be variously shaped and made by a variety of packaging methods suitable to hold the pre-cut attachable/detachable covering lens.

Figure 12:
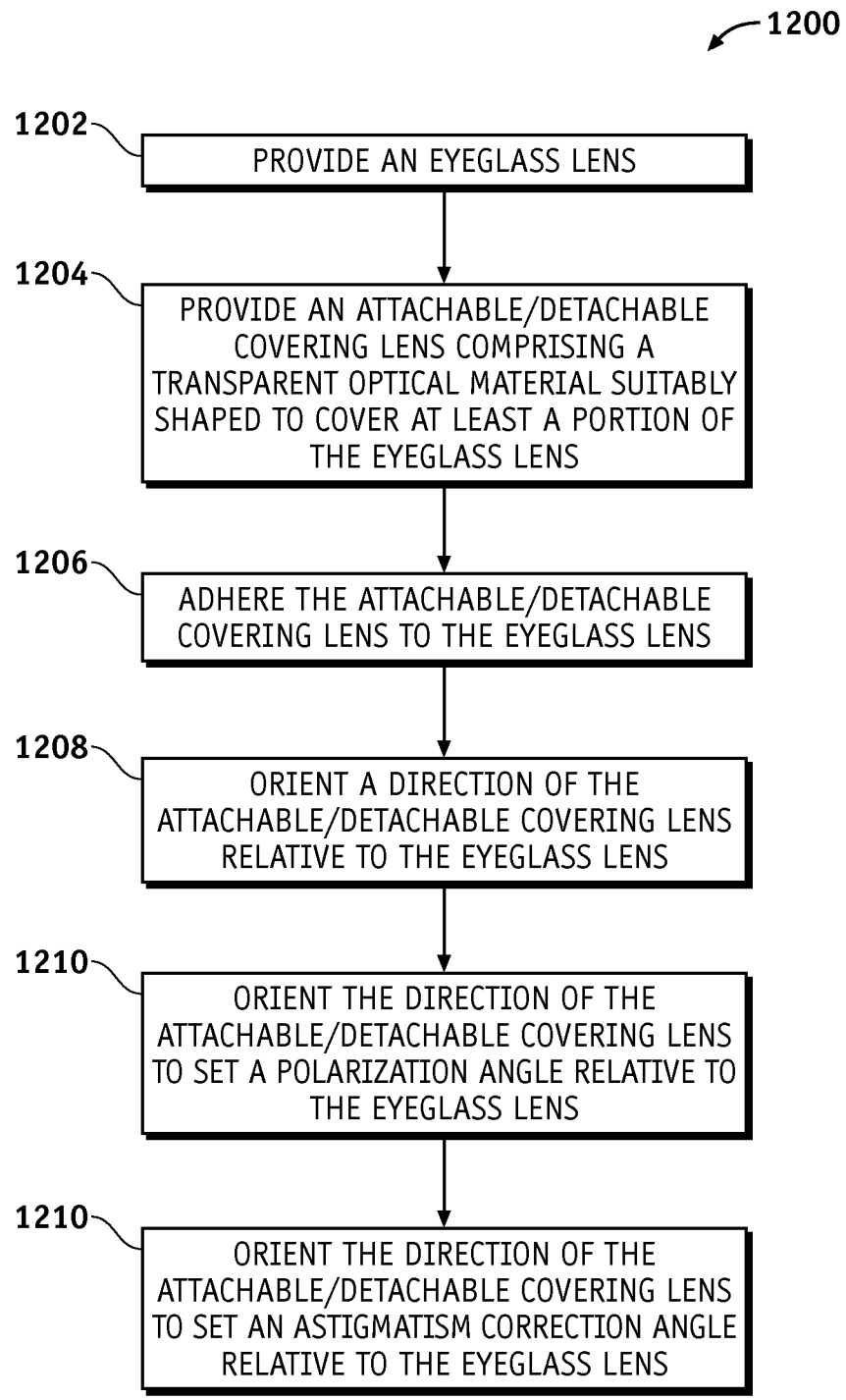
FIG. 12 is an illustration of a flowchart showing an exemplary process for covering eyeglass lenses with an attachable/detachable covering lens according to an embodiment of the disclosure.

FIG. 12 is an illustration of a flowchart showing an exemplary process 1200 for covering eyeglass lenses with an attachable/detachable covering lens according to an embodiment of the disclosure. It should be appreciated that the process 1200 may include any number of additional or alternative tasks, the tasks shown in FIG. 12 need not be performed in the illustrated order, and the process 1200 may be incorporated into a more comprehensive procedure or process having additional functionality not described in detail herein. For illustrative purposes, the following description of the process 1200 may refer to elements mentioned above in connection with FIGS. 1-11.

In practical embodiments, portions of the process 1200 may be performed by different elements of the attachable/detachable covering lenses 202/204, for example, the right lens 102, the left lens 104, the attachable/detachable covering lenses 202/204, tabs 206/208, the sun-shield 402/404, the corrective lenses 502/504, the temporary 3-D polarized filters 602/604, the clip-on device 810, the clip-on device 908, the clip-on device 1010, etc. The process 1200 may have functions, material, and structures that are similar to the embodiments shown in FIGS. 1-11. Therefore common features, functions, and elements may not be redundantly described here.

Process 1200 may begin by providing an eyeglass lens (task 1202) such as the right lens 102 and the left lens 104 of the prescription glasses 100, a special purpose lens/eyeglasses such as sunglasses or 3-D lenses, reading glasses, a sun-shield such as the sunshield 402/404, an eyesight power correction such as the corrective lenses 502/504, two oppositely polarized filters, two oppositely colored filters, polarized 3-D movie viewing glasses, LCD-Shutter glasses, and the like.

Process 1200 may then continue by providing an attachable/detachable covering lens/contact lens comprising a transparent optical material suitably shaped to cover at least a portion of the lens (task 1204). The attachable/detachable covering lens/contact lens may comprise the sun-shield 402/404, the corrective lenses 502/504, the prescription covering lenses, the temporary 3-D polarized filters 602/604, the special purpose lens/eyeglasses such as: sunglasses or 3-D lenses, reading glasses, an eyesight power correction such as the corrective lenses 502/504, an LCD shutter, two oppositely polarized filters, two oppositely colored filters, polarized 3-D movie viewing glasses, LCD-Shutter glasses, the clip-on device 810, the clip-on device 908, the clip-on device 1010, and the like. The attachable/detachable covering lens/contact lens may provide, for example but without limitation, sun-shield protection, reading glass correction, vision correction, 3-D movie functionality, 3-D movie polarization, 3-D movie filtering, and 3-D movie color filtering, and the like.

Process 1200 may continue by adhering the attachable/detachable covering lens/contact lens to the eyeglass lens (task 1206). Adhering may comprise, for example but without limitation, mechanically coupling, clipping-on, electro-statically coupling, coupling via inherent viscosity of the optical materials without adhesives (e.g., glue), a "low-tack," re-adherable pressure sensitive adhesive (e.g., as in sticky Post-it™ notes), clipping-on, and the like.

Process 1200 may continue by orienting a direction of the attachable/detachable covering lens relative to the eyeglass lens (task 1208).

Process 1200 may continue by orienting the direction of the attachable/detachable covering lens to set a polarization angle relative to the eyeglass lens (task 1210).

Process 1200 may continue by orienting the direction of the attachable/detachable covering lens to set an astigmatism correction angle relative to the eyeglass lens (task 1212).

In this way, various embodiments provide mechanisms for easily overlaying an attachable/detachable 3-D glasses over the prescription glasses, a temporary sun-shield, or temporary eyesight correction to the prescription lenses, for reading, watching TV, or 3-D movie viewing experience. Embodiments also provide mechanisms for providing an easily attachable/detachable prescription lens over special purpose glasses such as, 3-D movie glasses, sunglasses, sun-shield, other prescription lenses, eyesight correction lenses, and the like.

While at least one exemplary embodiment has been presented in the foregoing detailed description, the disclosure is not limited to the above-described embodiment or embodiments. Variations may be apparent to those skilled in the art. In carrying out the disclosure, various modifications, combinations, sub-combinations and alterations may occur in regard to the elements of the above-described embodiment insofar as they are within the technical scope of the disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments.

It should be understood that various changes can be made in the function and arrangement of elements without departing from the scope of the disclosure as set forth in the appended claims and the legal equivalents thereof. Furthermore, although embodiments of the disclosure have been described with reference to the accompanying drawings, it is to be noted that changes and modifications may be apparent to those skilled in the art. Such changes and modifications are to be understood as being comprised within the scope of the disclosure as defined by the claims.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 2-11 depict example arrangements of elements, additional intervening elements, devices, features, or components may be present in an embodiment of the disclosure.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items in the grouping be present, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. An attachable/detachable lens for covering an eyeglass lens, comprising:
   a transparent optical material comprising temporary eyesight correction configured for 3-D viewing and suitably shaped to cover at least a portion of a prescription eyeglass lens to provide a 3-D viewer; and
   adhering means for coupling the transparent optical material to the prescription eyeglass lens, the adhering means comprising an inherent viscosity of the transparent optical material.

2. The attachable/detachable lens for covering an eyeglass lens of claim 1, wherein:
   the transparent optical material comprises a tab detached from the prescription eyeglass lens; and
   the tab is suitably shaped to be used for detaching the transparent optical material from the prescription eyeglass lens.

3. The attachable/detachable lens for covering an eyeglass lens of claim 1, wherein the temporary eyesight correction comprises a 3-D polarized filter.

4. The attachable/detachable lens for covering an eyeglass lens of claim 3, further comprising:
   a tab suitably shaped to be used for orienting the transparent optical material to provide an optical effect orientation, or
   a removable orientation marker suitably shaped to be used for orienting the transparent optical material to provide the optical effect orientation.

5. The attachable/detachable lens for covering an eyeglass lens of claim 4, wherein the optical effect orientation comprises a polarization orientation or an astigmatism orientation.

6. The attachable/detachable lens for covering an eyeglass lens of claim 1, wherein the 3-D viewer comprises: a 3-D movie viewer, a 3-D TV viewer, a 3-D image viewer, or a 3-D industrial viewer application.

7. The attachable/detachable lens for covering an eyeglass lens of claim 1, wherein temporary eyesight correction for 3-D viewing comprises: a colored lens, a polarized lens, a polarized passive 3-D lens, a polarized active 3-D lens, or an LCD shutter.

8. The attachable/detachable lens for covering an eyeglass lens of claim 7, wherein the LCD Shutter is operable to alternately block and transmit light.

9. The attachable/detachable lens for covering an eyeglass lens of claim 1, wherein the prescription eyeglass lens comprises an eyesight power correction.

10. A lens assembly, comprising:
    a frame comprising prescription eyeglass lenses coupled to one another by means of a bridge piece; and
    covering lens means comprising a 3-D viewer and detachably coupled to each of the prescription eyeglass lenses by inherent viscosity of the covering lens means, and comprising a transparent optical material comprising temporary eyesight correction for 3-D viewing suitably shaped to cover at least a portion of the prescription eyeglass lenses.

11. The lens assembly of claim 10, wherein the 3-D viewer comprises: a 3-D movie viewer, a 3-D TV program viewer, a 3-D image viewer, or a 3-D industrial viewer.

12. The lens assembly of claim 10, wherein the temporary eyesight correction for 3-D viewing comprises: a colored lens, a polarized lens, a polarized passive 3-D lens, a polarized active 3-D lens, or an LCD shutter.

13. The lens assembly of claim 10, wherein the prescription eyeglass lens comprises an eyesight power correction.

14. A method for covering eyeglass lenses, the method comprising:
    providing a prescription eyeglass lens;
    providing an attachable/detachable covering lens comprising a transparent optical material comprising temporary eyesight correction for 3-D viewing suitably shaped to cover at least a portion of the prescription eyeglass lens; and
    adhering the attachable/detachable covering lens to the prescription eyeglass lens by inherent viscosity of the attachable/detachable covering lens.

15. The method of claim 14, further comprising providing by the temporary eyesight correction a 3-D movie functionality, 3-D TV program viewing, 3-D image viewing, or a 3-D industrial viewing application.

16. The method of claim 14, wherein the attachable/detachable covering lens comprises: a polarized 3-D movie viewing glass, a polarized passive 3-D lens, or a polarized active 3-D lens.

17. The method of claim 14, further comprising orienting a direction of the attachable/detachable covering lens to set a polarization angle of the at least one polarized filter relative to the prescription eyeglass lens.

18. The method of claim 14, further comprising orienting a direction of the attachable/detachable covering lens to set an astigmatism correction angle of the at least one polarized filter relative to the prescription eyeglass lens.

19. The method of claim 14, further comprising orienting a direction of the attachable/detachable covering lens relative to the prescription eyeglass lens.

20. The method of claim 14, wherein the attachable/detachable covering lens comprises: an LCD shutter, a colored filter, or an LCD-Shutter glass.

\* \* \* \* \*